July 3, 1923.  1,460,674
G. B. HUTCHINGS
SIGN BOX
Original Filed March 20, 1920   2 Sheets-Sheet 1
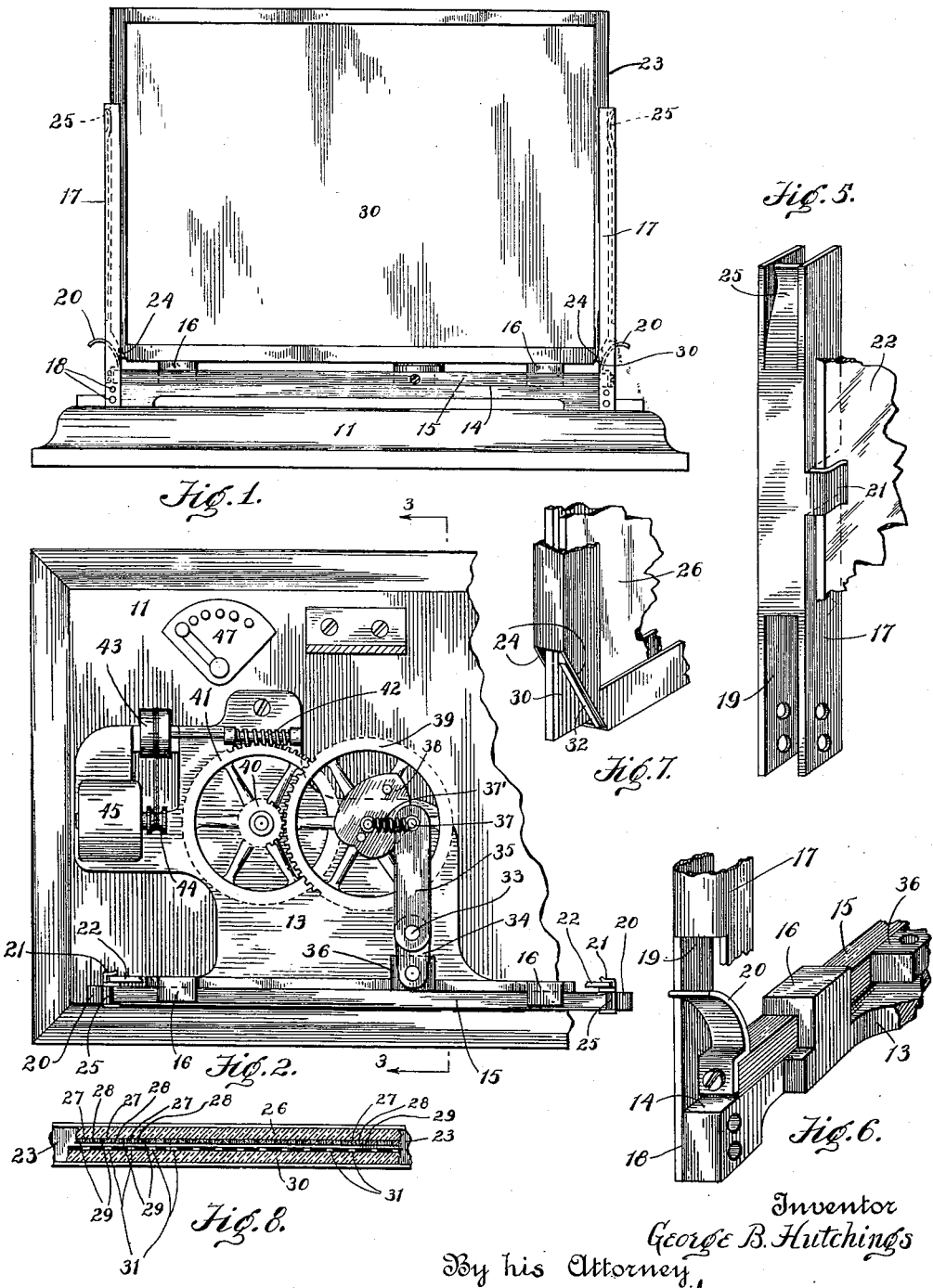
Inventor
George B. Hutchings
By his Attorney
Arthur Middleton Patented July 3, 1923.

1,460,674

UNITED STATES PATENT OFFICE.

GEORGE B. HUTCHINGS, OF RICHMOND, VIRGINIA.

SIGN BOX.

Application filed March 20, 1920, Serial No. 367,516. Renewed November 21, 1922.

*To all whom it may concern:*

Be it known that I, GEORGE B. HUTCHINGS, a citizen of the United States, residing at Richmond, Virginia, have invented certain new and useful Improvements in Sign Boxes, of which the following is a specification.

This invention relates to a picture slide that is adapted to be projected and of a type that gives a moving picture effect, together with a box or apparatus for projecting and moving the slide.

The slide is transparent and consists essentially of a screen member and a picture member, the picture member having a series of interrupted pictures superposed thereon, each of which requires the screen to be in a certain relation thereto to complete the interrupted pictures. The box for exhibiting the slides consists of illuminating or projecting means and a motor driven mechanism for slowly reciprocating either the screen member or the picture member with respect to the other member of the slide, whereby the moving picture effect is secured.

The invention is capable of several embodiments but the best or preferred embodiment is shown in the attached drawings in which—

Figure 1 is a front view, in elevation, of the device having the housing or casing removed;

Fig. 2 is a plan view of same partly broken away;

Figs. 5 and 6 are detail views, in prespective, of parts of the device;

Fig. 7 is a perspective view of a part of the slide frame showing a detail of construction and Fig. 8 is a diagrammatic view showing the construction and operation of the slides.

Figure 3:
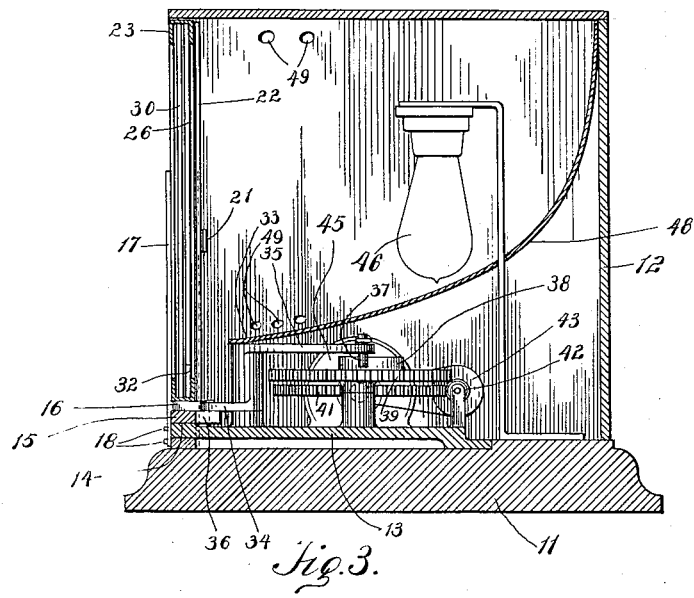
Fig. 3 is a section, in elevation, along the lines 3—3 of Fig. 2.
Figure 4:
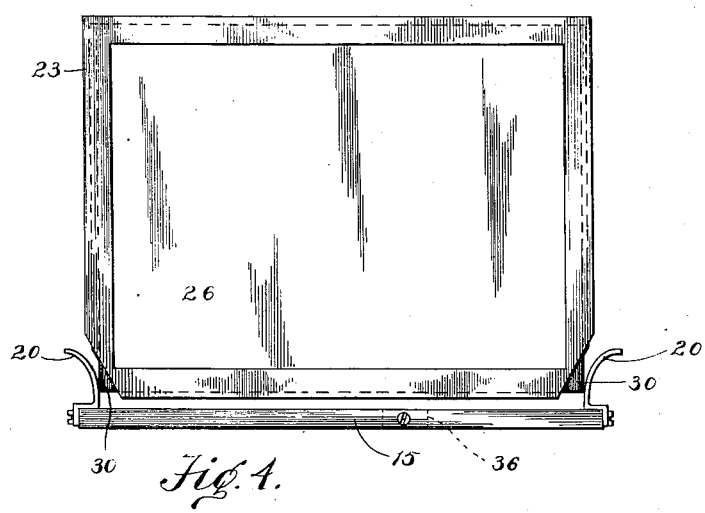
Fig. 4 is a view, in elevation, of a slide frame and shows its position with relation to reciprocatory member which will be hereinafter fully described.

In that embodiment of my invention shown in the drawings, the numeral 11 designates a bottom member of a casing 12 open at one end. 13 is a base plate provided with a bearing surface 14 upon which a reciprocatory member support, or carriage 15 is adapted to slide and which is held upon the bearing surface by means of angular members 16 formed upon the bed-plate and channeled members 17 which are attached to the bed-plate at 18.

The bases of the channeled members are partly cut away as at 19 to allow the passage of spring arms 20 attached to the ends of the reciprocatory member. Spring lugs 21 are formed upon the channeled members and form a holding means for a diffusing member 22.

A plate holding frame 23 having its lower corners cut away, as at 24, is intended to rest within the channeled members and is held snugly therein by flat spring formations 25 formed at the upper ends of the channeled members.

The frame 23 is adapted to hold against movement, a transparent plate or picture member 26 which fits snugly therein and which is provided with two or more series of impressions (preferably three) each series of which forms an interrupted picture when viewed independently as shown in Figure 8 where 26 is the transparent plate, 27 represents one series of impressions, 28 a second series and 29 a third series.

In close juxtaposition to the transparent plate is a screen member 30 slidably held within the frame and formed with transparent strip portions 31 which are aligned, in consecutive order, with each series of impressions upon the transparent plate.

The frame 23, plate 26 and screen 30 constitute an interchangeable unit.

The lower corners of the transparent plate are cut away as at 32, to conform with the cut away corners of the frame.

The lower edges of the sliding screen, at the corners, engage between the spring arms upon the reciprocatory member which arms snugly hold the screen, thereby causing it to follow the movement of said member or carriage which is operated by an oscillating member, pivoted to the bed plate at 33 and leaving a short arm 34 and long arm 35. The short arm engages a lug or block 36 secured to the carriage and the long arm is provided with a pin 37 adapted to engage a cam 38 upon a gear 39 which is rotated by the pinion 40, gear 41, worm 42, pulleys 43 and 44, and their connecting belt in turn actuated by any suitable motor 45.

The motor is preferably electric as is also an illuminating means 46 and any suitable starting and speed controlling device 47 may be provided. A spring 37′ is provided to normally keep the pin in contact with the cam.

The reciprocating member 15 is permitted slight movement transversely of its path when moving one of the plate members because it is reciprocated by the arm 34 which rotates around a pivot 33. It is then equivalent to a radius of a circle so that this movement of the member 15 must be permitted. To this end, the angular members 16 are open at their front ends.

In operation, the frame, containing the slidable screen and fixed transparent plate, is positioned upon the device between the channeled members and the diffusing screen placed between the plate and source of light as shown in Figure 3.

By means of the motor and its connecting mechanism, reciprocal movement is given to the carriage which in turn imparts its motion to the slidable screen.

The light passing through the diffusing plate, evenly penetrates the transparent plate and when observed from the front, the movement of the screen brings to view successively and completes the interruptions of each series of impressions.

The effect given is that of a continuously moving picture or a constantly changing picture. The time of exposure of each series of interrupted impressions which are completed by the screen is always even and regular and this result is accomplished during the change of direction of the motion of the screen, by means of the particular formation of the cam which actuates the oscillating member.

A heat deflecting and light reflecting member 48 may be provided to concentrate the light upon the diffusing plate as well as prevent the evaporation of the lubricating substance upon the mechanism by the heat from the source of light.

Suitable apertures 49 are provided to admit cool air and allow the displacement of the heated air.

It will be seen that this arrangement of parts affords a very compact device requiring no adjustment. The machine is adapted to hold one picture unit only, and this unit may be readily and quickly removed from its support and replaced by a new subject.

What is claimed is:—

1. A display device comprising a casing, provided with lighting means and power means, a reciprocating support moved by the power means and an interchangeable unit carrying a screen member and a picture member capable of being moved one in relation to the other to give an animated action, said unit being adapted to be inserted into the casing upon the reciprocating member, which gives effective action to the moving member within the unit.

2. The device of claim 1 in which the screen and picture members are supported in an upright position by means of a stationary channeled member.

3. A display device comprising a casing, provided with lighting means and power means, a reciprocating support moved by the power means and an interchangeable unit carrying a screen member and a picture member capable of being moved one in relation to the other to give an animated action, said unit being adapted to be inserted into the casing upon the reciprocating member, which gives effective action to the moving member within the unit, the screen and picture members being supported by a channeled member, said channeled member having a cut away portion.

4. The device of claim 1 in which the stationary portion of the interchangeable unit is provided at its lower corners with a cut away portion whereby the reciprocating member may engage the moving member.

5. The device of claim 1 in which the reciprocatory member is permitted a slight movement transversely of its path when moving one of the plate members.

6. The device of claim 1 in which the interchangeable unit is supported above the reciprocatory member.

In testimony whereof, I have signed my name to this specification, this 21st day of February, 1920.

GEORGE B. HUTCHINGS.